Patented Feb. 10, 1942

2,272,600

UNITED STATES PATENT OFFICE 2,272,600

COMPOUNDING RUBBER

Frank W. Corkery, Crafton, Pa., assignor to Pennsylvania Industrial Chemical Corporation, a corporation of Pennsylvania No Drawing. Application July 31, 1939, Serial No. 287,623

6 Claims. (Cl. 260—4)

This invention relates to the compounding of rubber; and the application for Letters Patent of the United States thereon is in part a continuation of application Serial No. 130,907, filed March 15, 1937.

My invention involves the compounding of rubber with use of a residual gum of specialized sort. Such residual gum is produced by oxidation of the still residue obtained in the treatment of light oil from the by-product distillation of coal. The light oil comes over in coal distillation, and is recovered from the gases with which it comes over by being absorbed in scrubbing oil which is ordinarily a heavy cut of petroleum.

The still residue with which I deal results from fractionation and purifying treatment of this light oil, following its removal from the scrubbing oil. This still residue contains polymers of resin-forming bodies in various stages of polymerization, some heavy monomers, traces of naphthalene, and various percentages of sulphates and sulphonates. It is a dark viscous oily substance deficient in drying qualities, and itself possessing little utility in the arts. As it is commercially available, the still residue may be obtained from either of the following operations conducted upon the light oil.

One such source of still residue is the still in which the light oil is purified and fractionated to give crude benzol, crude toluol, No. 1 crude solvent naphtha (crude xylol), and No. 2 crude solvent naphtha. The residuum from this fractionation consists largely of heat polymers, and is known in the trade as "crude still" residue. The fractions from the crude still, after washing with sulphuric acid and neutralization, are distilled in what are known in the trade as "pure stills." The residues from the distillation of these fractions comprise primarily acid polymers and heat polymers, and comprise also sulphonates. The residues from the pure still contain also sulphates from acid purification and neutralization which have not been wholly removed by washing. This pure still residue normally is mixed in a tank with the crude still residue, so that, as it is commercially available, still residue contains at least the residual products from these two types of still dealing with coke-oven light oil and its fractions.

Usually there is also mixed in with these two still residues in the residue tank a third residue, which comprises bottoms from the distillation of the heavier cuts of No. 1 and No. 2 crude solvent naphtha. Usually the still residue is subjected to a distillation for the removal of solvents and naphthalene. There is variation in the above-noted practice in different coking plants. In accordance with the invention disclosed in my above-noted co-pending application, I have discovered that these still residues or mixture of still residues possess to a substantial extent the quality of unsaturation, and that by taking advantage of this unsaturated condition of the material it may be oxidized to produce an elastic and pliable material, which material I have utilized in the compounding of rubber.

To describe the oxidizing treatment by which I convert the liquid oily still residue into an elastic and pliable material, I introduce the still residue as a liquid into a vessel provided with coils for circulating steam or other heating medium, and provided with perforated coils connected with a blower for introducing air under pressure. The still residue is heated in the vessel, desirably to an initial temperature approximating 175° F., in order to increase the fluidity of the material and facilitate the dispersion of air through it, and an oxygen-containing gas, preferably air, is then introduced in finely divided streams adjacent the bottom of the vessel, to pass upwardly through the body of still residue. In so doing, the air is introduced under such pressure that it is capable in dispersed condition of penetrating the body of liquid.

According to the viscosity to which the resultant elastic product of oxidation is brought, the introduction of air is continued for a greater or lesser period of time. Thus by continuing the introduction of air for a period of two days, while maintaining the still residue at the approximate temperature of 200° F., a noticeable thickening of the still residue indicating the progress of oxidation is effected. A treatment of such duration, the supply of air in good volume being maintained, raises the viscosity of the still residue from approximately 200 to 250 Saybolt at 212° F. to a viscosity of approximately 600 Saybolt at 212° F. In continuing the oxidation of the still residue, the temperature under which oxidation is further conducted desirably may be increased to from 200° F. to approximately 220° F., in order to facilitate the dispersion of air through the still residue undergoing treatment, and thereby to expedite oxidation of the still residue.

At the end of an additional two-day treating period under such conditions a still residue approaches the state of a solid at normal room temperature. Carrying oxidation further under temperatures ranging up to 245° F. or 250° F., the still residue more rapidly increases in viscosity, a total treating period of four and one-half to five days serving to raise the melting-point of the still residue to from 140° F. to 160° F. The oxidizing treatment can be terminated at any point, or may be continued, if desired, to a point at which the residual gum produced by oxidation has acquired a melting-point as high as approximately 225° F. It is the initial stages of the oxidation treatment which are prolonged, increased viscosity and melting-point proceeding rapidly as the state of a solid has been approximated.

During the initial stages of the oxidation treatment, naphthalene and certain other lighter ingredients of the still residue which are initially present are blown off. It is desirable to minimize the temperature of treatment during the initial stages of oxidation, in order to minimize evaporation of lower polymers comprised in the still residue, and thereby to produce a residual gum of high elasticity.

The residual gum, oxidized by passing air, or other oxygen-containing gas therethrough, has been oxidized by what is known in the paint and resin industries as "straight" oxidation. This is in distinction from oxidation by means of chemical oxidants, in the use of which there is some decomposition involved in the progress of oxidation. The oxidized gum differs substantially from the unoxidized still residue, in that it has acquired body and elasticity, and is of decreased iodine value and solubility. If carried to a melting-point approximating 80° F., it becomes insoluble in petroleum distillates in which raw still residue is as to its preponderant content soluble. For my present purpose, namely, the compounding of rubber, this insolubility of the residual gum is a matter of primary advantage. The lowering of iodine value is a matter of importance for the reason that as incorporated in a rubber composition the oxidized still residue is not readily susceptible to further oxidation under the conditions in which the rubber is used.

I have found that I may, in compounding rubber, utilize the residual gum within a relatively wide melting range. Also, I have found that in milling it breaks down the rubber particularly well, thus facilitating and expediting compounding of the rubber with other standard ingredients of a rubber compound. The operation of compounding rubber consists primarily in milling the rubber in unvulcanized condition with filling and toughening materials, of which common examples are carbon black, zinc oxide, and infusorial earth. Sulphur is also milled in, and in modern practice some one or more accelerators of vulcanization, some one or more anti-oxidants, and some one or more softeners and dispersants are also used. Pine tar may be considered to be the standard softener and dispersant used in compounding rubber. After the various additive substances have been milled into the rubber, the compound is vulcanized, or "cured" with heat, as in heated molds, in a steam-heated press, under hot water, or in some other suitable manner.

I may give an otherwise standard formula for automobile tire tread stock as follows, the parts being by weight:

|  | Parts |
|---|---|
| Smoked sheets | 100 |
| Zinc oxide | 5 |
| Sulphur | 3 |
| Rubber accelerator (specifically: mercapto-benzo-thiazole) | 0.85 |
| Carbon black | 40 |
| Anti-oxidant (specifically: phenyl alpha-naphthylamine) | 1 |
| Stearic acid | 4 |
| Softener (residual gum) | 3 |

Utilizing this formula, which may be considered standard, save for the use of the residual gum as a softener, I have used chiefly residual gum of three widely different viscosities. One example of the residual gum consisted of the still residue oxidized to a melting-point of about 90° F. Another example was this gum having a melting-point of about 90° F. in solution in an oily material formed chiefly of the lower polymers of indene, coumarone, and the like, in a proportion of about 75% of the gum and 25% of the polymer oil. Another exemplary sort of residual gum which I have used has a melting-point of about 135° F. Different samples of the rubber blend, including these three sorts of residual gum, were subjected to cure at 280° F., each for test periods of 30 minutes, 45 minutes, 60 minutes, 90 minutes, and 120 minutes. Of these curing periods the one for 30 minutes is in the rubber industry considered to be an under-cure, while a curing period of 120 minutes is in the rubber industry considered to be an over-cure.

In comparison with the effect produced in identical curing periods upon blends which were identical with the one given, save that they contained the typical rubber softener, pine tar, in place of the residual gum, the results are remarkably in favor of the residual gum. I have found that the tests on modulus of 300% and 500% show that a softer stock is produced by use of the residual gum than is produced by use of pine tar. As reflected in the latter tests, it has been found that the rubber compound containing the residual gum is superior to the similar compound containing pine tar in its resistance to cracking. Resistance to abrasion is for similar curing periods in favor of the rubber compound containing the pine tar.

Being of lesser stiffness than the rubber compound containing pine tar, the compounds containing residual gum are more flexible and show a much higher ultimate elongation. For all periods of cure the tensile strength of the rubber compound compares favorably to a similar rubber compound containing the pine tar. It is higher when the compounds are subjected to over-cure, an over-cure of the rubber compound containing the residual gum showing approximately the same tensile strength as a similar sample subjected to what may be considered an optimum period of cure, while over-cure detracts greatly from the tensile strength of a rubber compound containing pine tar. Thus taking as an example a sample of rubber compound as above composed, which contained as a softener residual gum having a melting-point of about 135° F., when subjected to curing for 90 minutes at 280° F., the tensile strength was 4440 as an average taken from a number of test samples. When subjected to over-curing by curing for 120 minutes the tensile strength was 4570. On the contrary, when subjected to a curing period of 90 minutes at 280° F. the average tensile strength of samples containing pine tar was 4590. When subjected to over-curing by curing for 120 minutes the tensile strength dropped to 4270.

On subjection to artificial aging it was found that the rubber compounds containing residual gum of varied viscosity showed no greater loss in tensile strength and ultimate elongation than samples containing pine tar, when compared samples of the compounds were subjected to an under-cure. When subjected to an over-cure, loss in tensile strength and elongation was less for samples of compounds containing the residual gum than for samples containing pine tar. Aging tests were conducted by subjection to oxygen bomb for periods of 72 hours.

Comparative tests between otherwise identical rubber compounds containing pine tar and containing the residual gum show that the rubber compound containing pine tar is stiffer than the rubber compound containing the residual gum. Both as to normal elongation and elongation after aging, the compounds containing the residual gum have higher ultimate elongation with respect both to normal and with respect to aged samples than the compounds containing the pine tar. Comparing both the normal tensile strength and the tensile strength of aged samples for the three types of residual gum which have been taken as exemplary with pine tar, I have found that in comparison with pine tar the residual gum has no adverse effect on tensile strength but seems on the contrary to improve the tensile strength of the rubber compound in which it is incorporated. The tensile strength being substantially equal for lower cures and noticeably in favor of the compounds containing the residual gum when subjected to over-cure, an outstanding advantage of a rubber compound containing the residual gum is thus seen to be in the fact that it minimizes disadvantageous effects resulting from over-curing the rubber. It is also a fact that the residual gum does not act in part as an accelerator in curing the compound, and its use therefore does not lead to what are in effect over-cures, but obtained accidentally in normal treating periods. It is a typical quality of the residual gum that it is approximately neutral, having an acid value of less than 1. The various pitches, such as stearin pitch, cottonseed pitch, pine tar pitch, and the like, which contain vegetable or fatty acids, tend initially to activate the cure, thus frequently causing unexpected over-cures. This is also true of creosote oil, due to the presence of phenols and phenolic acids.

The residual gum possessing in itself flexibility, and in degree elasticity, may be incorporated in a rubber compound in larger quantities than resins of various sort. Thus I have included in an otherwise standard typical rubber formula, such as that given above, from 15 to 20 parts of residual gum, constituting more than 10% of the total composition. Such rubber compound I have found very susceptible to abrasion, particularly for the lower curing periods. When over-cured, as, for example, when cured for a period of 120 minutes at 280° F., the compound had substantially increased resistance to abrasion, and showed up well in comparison with wholly standard formulae with respect to its ultimate elongation and tensile strength. Such compounds I have found to be particularly soft and particularly resistant to cracking. The effective aging was proportionately less than is the case of a standard rubber compounding formula.

The desirable effects of my residual gum, as incorporated with rubber, may be attributed largely to the fact that it is so oxidized that its iodine value is substantially lowered by pre-oxidation. Also the elasticity of the material gives it, in itself, rubber like characteristics, so that to a great extent it may act, when incorporated with rubber, as a rubber substitute as well as performing the function of a dispersing and softening agent in the rubber. The fact that the residual gum is insoluble in petroleum, acquiring such insolubility by oxidation, renders it suitable for use in rubber which is to be used for purposes, such as vehicle tires, in which there is likelihood that the rubber may be subjected to contact with petroleum oils.

It should be clearly understood that the formula for tire tread stock is exemplary only, since the residual gum may be used in various rubber compounds as well as in varied proportions of the residual gum to the other content of the rubber compound. For example, it may also be used in mechanical rubber goods, and can be used in considerable quantity, with particularly great advantage, for those purposes in which reclaimed rubber and a large proportion of filler are used, such as compounds for rubber shoe heels, rubber mats, rubber gaskets, and the like. In all the many rubber compounds in which it may be included, it performs the same functions which have been noted for it in the exemplary formula for tire tread stock given in detail above. For some purposes, the residual gum may be compounded with the rubber in any quantity short of such proportion that the compound ceases to be characteristically a rubber compound.

Whereas the residual gum included in the examples given above has in each example been a gum solid at normal room temperature, it is to be understood that for most purposes, including a rubber compound for tire tread stock, the residual gum may be of far lower viscosity. There is, however, a lower viscosity limit, a viscosity lower than which indicates that the initial still residue has not been oxidized to a degree sufficiently to reduce its unsaturation, and which is of itself inadequate to cause the gum to impart to a rubber compound containing it novel and desirable characteristics commensurate with those which have been noted. I have found that a viscosity of 1500 Saybolt at 210° F. is approximately the lowest viscosity at which the effects of oxidation in the still residue result substantially in advantageous characteristics of the rubber compound in which the oxidized still residue is included.

Desirably, though not necessarily, the still residue is purified before its oxidation by removal of sulphates and sulphonates of coumarone and indene, the presence of which in the still residue has been above noted. This purification may be effected in any desired manner, and may, for example, be effected by agitating the still residue with a low-boiling aliphatic hydrocarbon solvent in accordance with my United States Patent No. 2,135,427, dated November 1, 1938. Whether purified or unpurified, its peculiar value in rubber compounding rises from its preoxidized condition. Since the still residue contains dimers and other polymers of coumarone and indene, the dimers being the polymers particularly susceptible to oxidation, the purified and oxidized still residue is in effect the oxidation product of a low-polymer coumarone-indene resin; and my invention contemplates the use in compounding rubber of such resin in oxidized condition. It is, however, a requisite of the oxidized resinous material which I use in compounding rubber, whether it be in the form of unpurified still residue, or in the form of low polymer coumarone-indene resin, that it be a gummy material resultant from a "straight" oxidation resulting from blowing with air or other oxygen-containing gas, and that it should not be the product of decomposition and rearrangement resultant from treatment with oxidant reagents.

I claim as my invention:

1. A composition rubber compounded with a substantial proportion of low-polymer coumarone-indene resin initially fluid at normal room temperature oxidized by blowing it with an oxygen-containing gas to the state of a gum solid at normal room temperature.

2. In the process of compounding rubber the herein described step of expediting and improving dispersion of filling material through the rubber by milling with the rubber and filling material a substantial proportion of a gum solid at normal room temperature resultant from the oxidation by blowing with an oxygen-containing gas of low-polymer coumarone-indene resin initially fluid at normal room temperature, as a dispersing agent for the rubber and filling material.

3. A composition rubber compounded with a substantial proportion of unsaturated aromatic still residue from the distillation of light oil derived in the by-product coking of coal, said still residue being an initially oily liquid oxidized by blowing with an oxygen-containing gas to a viscosity of at least 1500 Saybolt seconds at 210° F.

4. A composition rubber compounded with a substantial proportion of a residual gum solid at normal room temperature resultant from oxidizing by blowing with an oxygen-containing gas an initially liquid oily unsaturated still residue from the distillation of light oil derived in the by-product coking of coal.

5. In the process of compounding rubber the herein described step of expediting and improving dispersion of filling material through the rubber by milling with the rubber and filling material a substantial proportion of an initially liquid oily unsaturated aromatic still residue from the distillation of light oil derived in the by-product coking of coal oxidized by blowing with an oxygen-containing gas to a viscosity of at least 1500 Saybolt seconds at 210° F., as a dispersing agent for the rubber and filling material.

6. In the process of compounding rubber the herein described step of expediting and improving dispersion of filling material through the rubber by milling with the rubber and filling material a substantial proportion of a residual gum solid at normal room temperature resultant from oxidizing by blowing with an oxygen-containing gas an initially liquid oily aromatic unsaturated still residue from the distillation of light oil derived in the by-product coking of coal, as a dispersing agent for the rubber and filling material.

FRANK W. CORKERY.